Aug. 7, 1951  E. T. CANDEE  2,563,578

FLEXIBLE CORRUGATED SEAMLESS METAL TUBING

Filed April 12, 1946

INVENTOR.
Ellsworth T. Candee

BY
ATTORNEYS

Patented Aug. 7, 1951

2,563,578

UNITED STATES PATENT OFFICE 2,563,578

FLEXIBLE CORRUGATED SEAMLESS METAL TUBING

Ellsworth T. Candee, Watertown, Conn., assignor, by mesne assignments, to Technicraft Laboratories, Inc., a corporation of Connecticut Application April 12, 1946, Serial No. 661,903

3 Claims. (Cl. 138—70)

This invention relates to flexible corrugated seamless metal tubing. In accordance with the invention, tubing of this character which is of rectangular or other polygonal cross section is made available as a new article of commerce. Further, the invention provides a flexible wave guide in which seamless corrugated flexible metal tubing of rectangular cross section forms the fundamental flexible element. A method for making the rectangular or other polygonal flexible corrugated seamless metal tubing of this invention and apparatus for making such tubing are fully described and claimed in a co-pending application which is a division of this application.

Flexible corrugated seamless metal tubing of circular cross section, both with annular corrugations and with helical corrugations, has been available for many years. Heretofore, however, it has not been possible to produce polygonal tubing of this character. For those uses requiring flexible metal tubing of rectangular or other polygonal cross section, it has been necessary to employ tubing of the strip wound, mechanically interlocked type, or other type of flexible metal tubing formed with seams.

The rectangular or other polygonal flexible corrugated seamless metal tubing provided by this invention is characterized by having a plurality of deep narrow corrugations spaced apart a distance approximating their depth. (In referring to the corrugations as being "spaced apart a distance approximating their depth," both throughout the specification and in the claims, I mean that the ratio of spacing to depth of the corrugations is small enough to render the tubing quite flexible; but do not mean that it is necessarily 1:1; it may vary, for example, from 1:3 to 3:1, or over an even somewhat wider range, depending upon such factors as size of the tubing, actual depth of the corrugations, wall thickness, etc.) The outer surface of the corrugations at the corners of the tubing is generally formed with a substantial radius of curvature in a plane normal to the axis of the tubing. These corrugations render the tubing extremely flexible, and permit it to be bent readily through a short radius.

The new seamless corrugated flexible metal tubing of polygonal cross section of this invention may be made by forming an outward peripheral bulge on a seamless polygonal metal tube, and subsequently squeezing the bulge at its base to narrow and deepen it into a corrugation. The initial bulging of the tube advantageously is effected under conditions such that somewhat greater bulging pressure is applied at the corners of the tube than at the sides, thus assuring adequate bulging of the tube wall at the corners to form, in the subsequent squeezing operation, full-depth, unwrinkled and unruptured corrugations even at these points of maximum metal deformation. The initial outward peripheral bulging of the tube may be effected by applying pressure to a deformable plug located within the tube, while the tube is positioned within an opening in a die plate configured to limit bulging of the metal and to prevent improper deforming of the tube.

The apparatus by means of which the new seamless corrugated flexible metal tubing of rectangular or other polygonal cross section may be made comprises a pair of separable die plates defining between them a polygonal die opening. At least one peripheral groove is formed in the die plate walls of said opening. Means advantageously in the form of a deformable but substantially incompressible plug positioned within a tube to be corrugated is provided for bulging the walls of the tube outwardly into the grooves. The apparatus also includes means for closing a bulge thus formed in the tube to form therefrom a corrugation. These means advantageously comprise a pair of closure plates mounted one over each die plate and defining between them a tube-receiving opening of the same size and shape as the die opening, and axially aligned therewith. The closure plates are mounted so as to be movable toward and away from the die plates, thereby to permit closing into a corrugation a bulge in a tube gripped between the closure plates and the die plates.

Spacers between the closure plates and the die plates advantageously are provided to limit movement of the closure plate toward the die plate to prevent excessive flattening of a corrugation as it is being formed by such movement from a previously formed bulge.

The invention is described in greater detail below with reference to the manufacture of flexible seamless corrugated metal tubing of rectangular cross section. It is understood, however, that the following description is also applicable to tubing of other polygonal cross sections. The description is presented in connection with the accompanying drawings, in which Fig. 1 is a plan view of a rectangular tube as it appears while being corrugated, showing bulges formed preliminary to forming the corrugations;

Figure 6:
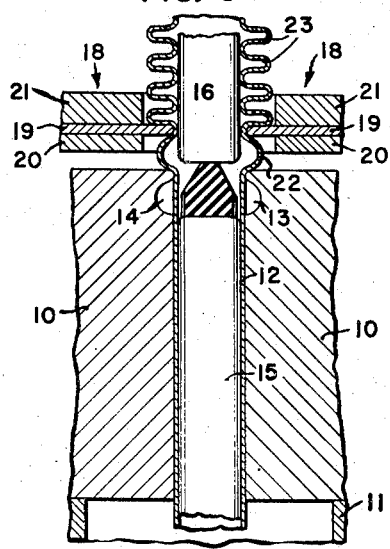
Fig. 6 is a section through one form of apparatus for producing corrugated tubing of the invention.

Referring to Fig. 6, a tubing-corrugating apparatus, which is fully disclosed in my co-pending divisional application, comprises a pair of separable die plates 10 supported on a base plate 11. Guides (not shown) are formed integrally with the base plate 11, or fastened thereto, and define a channel in which the die plates 10 may move toward or away from each other. Locking means (also not shown) are provided to lock the die plates in the closed position shown.

Each of the die plates is formed with an aperture in that edge which bears against the adjacent edge of the other die plate, and when the two die plates are brought together, these apertures are in registry so as to form the rectangular die opening in which a rectangular tube 12 to be corrugated is received. The tube 12, of course, fits quite snugly in the die opening, which is of the particular size and shape required to insure such fit of the tube to be corrugated. An oversize opening in the base plate 11, directly beneath the die opening between the die plates 10, permit the tube 12 to enter the die opening from beneath the press platform.

The die plate walls defining this tube opening are formed with peripheral grooves 13 and 14 into which the walls of the tube 35 may be bulged upon application of an expansive force within the tube.

The means for applying the expansive bulging force within the tube 12 comprises a lower mandrel 15 bearing at its lower end against a fixed support (not shown) and terminating at its upper end just below the lower edge of the peripheral grooves 13 and 14. This mandrel extends up through the tube 12 to be corrugated, and its cross-sectional dimensions are such that it fits fairly snugly within the tube 12. An upper mandrel 16, similar in cross-sectional size and shape to the lower mandrel 15, extends into the upper portion of the tube 12.

Located within the tube 12 between the mandrels 15 and 16 is a deformable but substantially incompressible plug 17. When the mandrel 16 is forced downwardly and exerts pressure against the plug 17, the plug is squeezed between the two mandrels and deforms, transmitting a bulging force to the walls of the tube 12 and causing it to be bulged outwardly into the grooves 13 and 14.

The deformable plug 17 advantageously is of rubber and comprises a substantially rectangular body or base portion surmounted by a pyramidal roof portion. The base portion of the plug is of a length and breadth such that it fits fairly snugly within the tube 12 to be corrugated, and is of a height approximately equal to the height of the bulge formed by its deformation. The pyramidal roof portion of the plug provides the excess of rubber necessary to expand the tube into the grooves 13 and 14 in the die plates, and advantageously this pyramidal roof section is truncated, so that the base of the upper mandrel 16 will have a good bearing surface.

It is generally preferable to apply somewhat greater bulging force to the corners of the tube being corrugated than to its sides, and for this purpose the sides of the plug base portion advantageously are slightly concave. However, especially when the tube to be corrugated is of fairly heavy wall-thickness, it is not essential that the sides of the plug be concave.

After bulging the tube 12 outwardly and peripherally, the next step is to close the bulge thus formed into a corrugation. For this purpose the apparatus is provided with a corrugation-closure plate assembly 18. This assembly comprises a pair of closure plates 19 each mounted above one of the die plates 10, and each recessed at that edge which meets with the corresponding edge of the other closure plate, so as to form between the plates a tube-receiving opening of substantially the same size and shape as the die opening between the die plates, and axially aligned therewith. A pair of spacers 20, also of a thickness equal to the thickness of a corrugation and arranged below the closure plates 19, and a pair of cover plates 21, complete the closure plate assemblies. Each assembly is held together by means which need not be here illustrated.

After a bulge 22 has been formed in the wall of the tube 12 being corrugated, the die plates 10 and the closure plate assemblies 18 are separated and the tube is raised by an amount such that the bulge formed in the peripheral grooves 13 and 14 now is located with the base of its lowerside bearing against the die plates at the edge of the die opening. In this position, the closure plate assemblies must be raised from the die plate sufficiently to permit the closure plates 19 to embrace the bulged tube and to bear against the upperside of the bulge 22 at its base. Then, when a force is applied to the closure plate assembly to force it down against the die plate, the bulge 22 gripped between the closure plates and the die plates is narrowed and deepened into a corrugation. The spacers 20 at the bottom of the closure plate assemblies limit movement of these assemblies toward the die plates, so that when the bulge is narrowed into a corrugation 23 it is not excessively flattened.

In the hands of a practiced operator, manipulation of the apparatus as above-described may be carried out rapidly and without damage to the tubing, even though it may be very thin-walled and the alternate formation of bulges and compression of them into corrugations may be repeated as outlined above until corrugation of an entire tube or any desired portion of it is completed.

The apparatus has been described with particular reference to hand-operation, but it is understood that it may be operated automatically. It may be fully automatic in operation, so that opening and closing of the die plates, upward advance of the tubing, and operation of the closure plate assemblies all are effected automatically; or if desired the apparatus may be designed so that some of these operations are automatic while others are hand-performed or hand-controlled.

Figure 7:
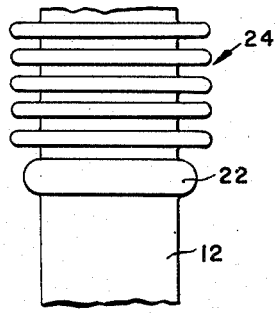
Fig. 7 is an elevation of tubing as it appears in the course of manufacture by means of apparatus as shown in Fig. 6.

Tubing as it appears in the course of being corrugated is shown in Fig. 7. Immediately above the uncorrugated seamless tubing blank 12 is the bulged section 22, and above this is the finished corrugated section 24.

Figure 1:
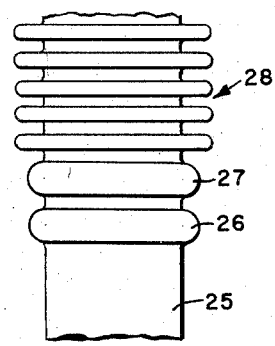

In Figure 1, a piece of tubing 25 as it appears in the course of being corrugated by a modified apparatus, similar to that described above in connection with Figure 6, is illustrated. This modified apparatus is fully disclosed and described in my aforementioned copending divisional application and accomplishes the formation of the bulges in two steps, first as an initial bulge 26 and then as the final bulge 27. For this purpose the modified apparatus makes use of two plugs, similar to plug 17, located one above the other. As pointed out in the co-pending application there are certain advantages incident to the formation of the bulges in two steps but as this invention is not directed to the manner in which rectangular or polygonal corrugated seamless tubing is formed nor to the apparatus for so forming it, the modified apparatus is not here disclosed. It will suffice to say that corrugated seamless tubing of the type contemplated by this invention can be made in the manner described in connection with Figs. 6 and 7, but modified to the extent that the bulges are formed in two steps. The corrugations 28 formed in tubing 25 are the same as corrugations 24 of tubing 12.

Figures 2, 3:
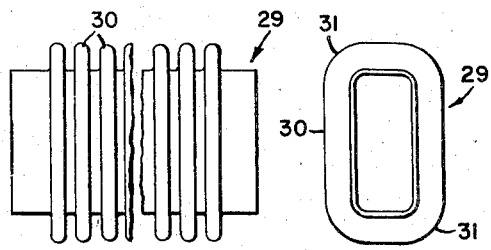
Fig. 2 is an elevation of rectangular corrugated seamless tubing according to the invention.
Fig. 3 is a cross section through the tubing shown in Fig. 2.

Figs. 2 and 3 illustrate a completed length of corrugated tubing 29. In this tubing, all bulges have been narrowed and deepened into corrugations 30. The corrugations are relatively deep and narrow, and are spaced apart a distance approximating their depth. As best shown in Fig. 3, the tubing is substantially rectangular in cross section. At the corners of the tubing, however, the outer surfaces 31 of the corrugations are formed with a substantial radius of curvature. The depth of the corrugations is almost, if not quite, as great at the corners as in the middle of the side or edge wall of the tube. In consequence of these relatively deep, narrow and closely spaced corrugations, the tubing is extremely flexible and may be bent through a short radius, either sidewise or edgewise.

Figure 4:
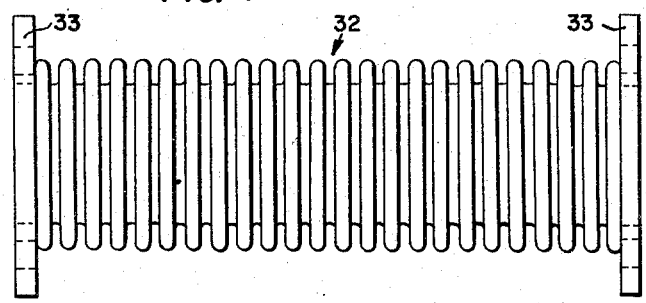
Fig. 4 is an elevation of a flexible wave guide made from rectangular flexible corrugated tubing according to the invention.
Figure 5:
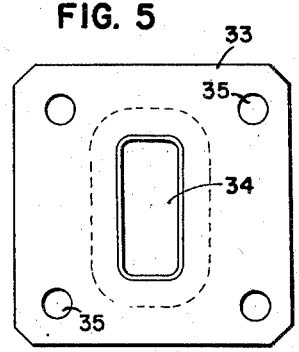
Fig. 5 is an end view of the wave guide shown in Fig. 4.

The new tubing is admirably suited for use in making flexible wave guides, of which one form is shown in Figs. 4 and 5. The wave guide shown comprises a length of corrugated seamless metal tubing 32 of rectangular cross section. The dimensions of the tubing are, of course, preselected according to the wave length of the radiation to be transmitted through the guide. End fittings 33 are brazed or otherwise secured to the ends of the length of tubing 32. The end fittings are formed with a substantially central opening 34 accurately matched to the minimum inside diameter of the tubing, and is provided with holes 35 for mounting purposes.

Flexible wave guides of this character are excellently suited for connecting rigid wave guides to each other, or to other equipment, at points where some flexure is necessary or desirable. Rectangular tubing ordinarily is necessary for efficient wave guides, and flexible corrugated seamless rectangular metal tubing may be made in accordance with the above procedure with proper spacing of the corrugations, and with the necessary uniformity in size and shape of corrugations, to insure minimum power losses due to reflection or other causes when the tubing is employed in the manufacture of flexible wave guides.

While the tubing of the invention is extremely flexible to bending forces applied parallel to a side or edge, it is resistant to torsion forces. Also when a bending force is applied to the tubing, the closely spaced corrugations each accommodate substantially equal increments of the total bending force, so that even when the tubing is bent, uniformity in spacing of the corrugations is preserved. These characteristics make the new tubing very useful for wave guide purposes, and for other uses as well.

While the manufacture of rectangular corrugated seamless metal tubing has been particularly described corrugated seamless metal tubing of other polygonal cross sections, such as corrugated seamless metal tubing of pentagonal, hexagonal or octagonal cross section may be manufactured with equal facility. The only major change required in the apparatus described above to make corrugated seamless metal tubing of these other polygonal cross sections is to make the die opening of the shape and size desired, and to make the upper and lower mandrels and the deformable plugs of the corresponding cross-sectional shape and size. The method of making corrugated seamless metal tubing of these other cross-sectional shapes is essentially the same as herein described for making the rectangular tubing.

As with the rectangular tubing, flexible corrugated seamless metal tubing of these other polygonal cross sections is characterized by having a plurality of deep and narrow annular corrugations, spaced apart a distance approximating their depth, and with the outer surfaces of the corrugations being formed with a substantial radius of curvature at the corners of the tubing.

It is evident that other modifications than those specifically described herein may be made within the scope of the invention.

I claim:

1. Flexible corrugated seamless metal tubing of polygonal cross section, said tubing being made of thin-gauge metal and being formed with a multiplicity of closely spaced annular corrugations each extending completely therearound, the side walls of said corrugations being substantially perpendicular to the axis of said tubing and the depth of said corrugations being at least substantially as great as their width and being at least several times greater than the thickness of the metal of which the tubing is made, said corrugations being spaced apart a distance substantially equal to their width, the inner periphery of each corrugation having essentially a true polygonal form and the outer periphery thereof being characterized by having its corners formed at a substantial radius of curvature approximately equal to the depth of the corrugations, said corrugated tubing being easily flexible in any direction at an angle to its axis.

2. Flexible corrugated seamless metal tubing of rectangular cross section, said tubing being made of thin-gauge metal and being formed with a multiplicity of closely spaced annular corrugations each extending completely therearound, the side walls of said corrugations being substantially perpendicular to the axis of said tubing and the depth of said corrugations being at least substantially as great as their width and being at least several times greater than the thickness of the metal of which the tubing is made, said corrugations being spaced apart a distance substantially equal to their width, the inner periphery of each corrugation having essentially a true rectangular form and the outer periphery thereof being characterized by having its corners formed at a substantial radius of curvature approximately equal to the depth of the corrugations, said corrugated tubing being easily flexible in any direction at an angle to its axis.

3. A flexible wave guide comprising a length of flexible corrugated seamless rectangular metal tubing according to claim 2, said length of tubing having attached to each end a flange having therethrough an opening of the same size and substantially rectangular shape as the inner periphery of each corrugation of the tubing, said opening being in alignment with the inner peripheries of said tubing corrugations.

ELLSWORTH T. CANDEE.

REFERENCES CITED

The following references are of record in the file of this patent:

UNITED STATES PATENTS

| Number | Name | Date |
|---|---|---|
| 540,584 | Dieckmann | June 4, 1895 |
| 726,456 | Prentice | Apr. 28, 1903 |
| 1,648,046 | Fulton | Nov. 8, 1927 |
| 1,879,663 | Dreyer | Sept. 27, 1932 |
| 2,039,781 | Debondetti | May 5, 1936 |
| 2,306,018 | Fentress | Dec. 22, 1942 |
| 2,374,498 | Quayle | Apr. 24, 1945 |
| 2,405,437 | Leeds | Aug. 6, 1946 |